W. S. LAWYER.
Grain-Drill.

No. 29,497.

Patented Aug. 7 1860

Witnesses:
H. W. Coombs
R. S. Spencer

Inventor:
W. S. Lawyer
per Munn & Co.
Attorneys

UNITED STATES PATENT OFFICE.

WILLIAM S. LAWYER, OF GRATIOT, OHIO.

IMPROVEMENT IN SEEDING-MACHINES.

Specification forming part of Letters Patent No. 29,497, dated August 7, 1860.

*To all whom it may concern:*

Be it known that I, W. S. LAWYER, of Gratiot, in the county of Licking and State of Ohio, have invented a new and Improved Broadcast-Seeding Machine; and I do hereby declare that the following is a full, clear, and exact description thereof, reference being had to the accompanying drawings, making a part of this specification, in which—

Figure 1:
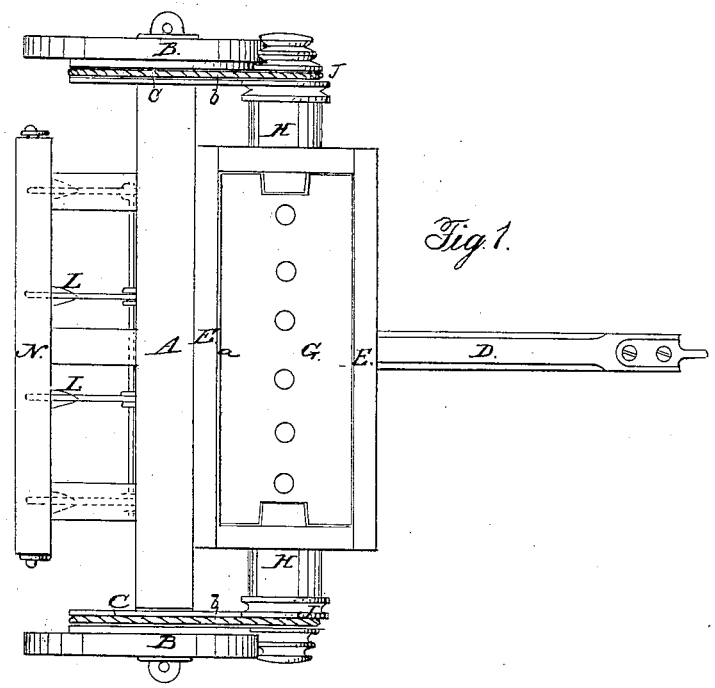
Figure 2:
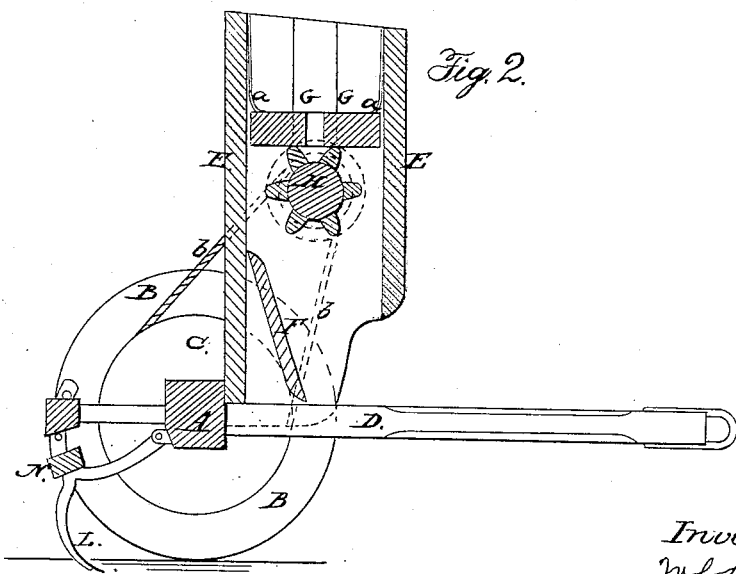

Figure 1 represents a plan view of the machine. Fig. 2 is a vertical longitudinal section taken through the machine from front to rear.

Similar letters of reference indicate corresponding parts in both figures.

This invention consists in distributing the seed by means of a fluted roller working under the rising and falling bottom of a flexible hopper, so that by rotating said fluted roller the seed is caused to discharge, and at the same time the bottom of the hopper closes down on the top of the distributing-roller, so as to prevent any discharge of seed when the roller is at rest, as will be hereinafter described and represented.

This invention and improvement is intended to obtain a very simple and efficient broadcast-seeding machine wherein only two devices are employed to effect the sowing of seed constantly and regularly without any waste of seed, either while the machine is in motion or while it is at rest.

To enable those skilled in the art to fully understand my invention, I will proceed to describe its construction and operation.

In the drawings, A represents an axle mounted upon two wheels, B B, which are driving-wheels.

C C are two large grooved pulley-wheels that are secured to the inside of the wheels B B.

D is the tongue or draft-pole to which the horses are attached for drawing the machine over the land.

E is a box extending up from the forward part of the axle A a suitable distance, in the top of which is arranged a receiver for the seed to be sown. The bottom of this box is open and furnished with a deflecting-board, F, that assists in spreading or scattering the seed as it falls from the hopper.

The hopper for receiving the seed, and from which it is dropped on the ground, consists of a perforated board, G, that is hung within and near the top of the box E by any suitable flexible fabric, as indicated by *a a*, Fig. 2, which allows the board G to rise and fall when acted upon by a fluted roller, H, that is placed directly under and in contact with this board G, as clearly shown in Fig. 2. This roller extends transversely across the box E and has its bearings in each end of the box E, and on the end of the rollers, outside of this box, are cone-pulleys J J, over which bands *b b* pass that transmit motion from the pulleys C C to the driving-wheels B B to the grooved or fluted distributing roller when the machine is drawn along.

Now, by reference to the drawings, Fig. 2, it will be observed that when the hopper is supplied with seed the seed will escape through the perforations in the same upon the roller H and into one of the channels in the same. Then when the roller is turned the seed in this channel will escape and fall to the ground, and soon as these channels are brought under the perforations in the hopper-bottom they are filled and afterward emptied. The bottom G of the hopper is kept in constant agitation by the roller, and the flow of the seed is thus kept up regularly and uniformly from the hopper. Then when the machine is stopped the roller will prevent the seed in the hopper from escaping.

In the rear part of the machine I have arranged a gang of shovel-plows, L, for covering over the seed after it has been scattered by the device above described. These shovels are all jointed to the axle A and secured to a brace-board N, so that they may be all adjusted simultaneously to plow deeper or shallower, as occasion requires.

From this general description it will be seen that the scattering of grain broadcast is effected with a very simple and cheap machine, which may be constructed by any ordinary workman.

Having thus described my invention, what I claim as new, and desire to secure by Letters Patent, is—

The combination of the suspended yielding hopper-bottom G with the fluted roller, the same being arranged and operated substantially as described.

WILLIAM S. LAWYER.

Witnesses:
ALEXANDER ADAIR,
MORGAN N. ODELL.